US007673447B2

(12) United States Patent
Gaiser (10) Patent No.: US 7,673,447 B2
(45) Date of Patent: Mar. 9, 2010

(54) EXHAUST SYSTEM FOR AN INTERNAL COMBUSTION ENGINE AND A RESPECTIVE OPERATING METHOD

(75) Inventor: Gerd Gaiser, Reutlingen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 226 days.

(21) Appl. No.: 11/240,283

(22) Filed: Sep. 30, 2005

(65) Prior Publication Data
US 2006/0021332 A1    Feb. 2, 2006

(30) Foreign Application Priority Data

Oct. 1, 2004    (DE)    ........................ 10 2004 048 335
Apr. 18, 2005  (DE)    ........................ 10 2005 018 032

(51) Int. Cl.
*F01N 3/00*    (2006.01)
(52) U.S. Cl. .................. 60/289; 60/284; 60/286; 60/288; 60/295; 60/297; 60/298
(58) Field of Classification Search .................. 60/285, 60/286, 288, 289, 295, 297, 298, 303, 274, 60/284
See application file for complete search history.

(56) References Cited

U.S. PATENT DOCUMENTS

| 3,203,168 | A | * | 8/1965 | Thomas ........................ 60/286 |
| 4,134,262 | A | * | 1/1979 | Sugihara et al. ................ 60/289 |
| 4,396,372 | A | * | 8/1983 | Matumoto et al. .......... 431/208 |
| 4,677,823 | A | * | 7/1987 | Hardy ........................ 60/274 |
| 5,052,178 | A | * | 10/1991 | Clerc et al. .................. 60/274 |
| 5,067,320 | A | * | 11/1991 | Kanesaki ..................... 60/297 |
| 5,074,121 | A | * | 12/1991 | Morris ........................ 62/173 |
| 5,320,523 | A | * | 6/1994 | Stark ........................ 431/353 |
| 5,412,946 | A | * | 5/1995 | Oshima et al. ................ 60/286 |
| 5,417,059 | A | * | 5/1995 | Hartel et al. .................. 60/276 |
| 5,570,576 | A | * | 11/1996 | Ament et al. ................ 60/300 |
| 5,617,720 | A | * | 4/1997 | Achleitner et al. ........... 60/274 |
| 5,746,989 | A | * | 5/1998 | Murachi et al. ......... 423/213.7 |
| 5,806,310 | A | * | 9/1998 | Daidou et al. ................ 60/286 |
| 5,826,428 | A | * | 10/1998 | Blaschke ..................... 60/303 |
| 5,829,248 | A | * | 11/1998 | Clifton ........................ 60/286 |
| 5,934,071 | A | * | 8/1999 | Schatz ........................ 60/284 |
| 6,244,044 | B1 | * | 6/2001 | Bartley ........................ 60/274 |
| 6,318,077 | B1 | * | 11/2001 | Claypole et al. ............. 60/303 |
| 6,729,125 | B2 | * | 5/2004 | Suga et al. .................... 60/285 |

(Continued)

FOREIGN PATENT DOCUMENTS

DE    3835939    10/1988

*Primary Examiner*—Tu M Nguyen
(74) *Attorney, Agent, or Firm*—Howard IP Law Group, PC (57) ABSTRACT

The present invention relates to an exhaust system for an internal combustion engine, in particular in a motor vehicle, with an exhaust line in which an oxidation catalyst is provided for treatment of the exhaust gases coming from the internal combustion engine. To be able to heat the oxidation catalyst more rapidly in a cold start of the internal combustion engine, a pre-oxidation unit may be provided in the exhaust line upstream from the oxidation catalyst and connected to a secondary fuel supply and adapted so that it partially oxidizes the secondary fuel supplied in combination with an oxidizer in a catalyst heating operation and the partially oxidized intermediate products are supplied to the oxidation catalyst for complete oxidation.

13 Claims, 4 Drawing Sheets

U.S. PATENT DOCUMENTS

| | | | |
|---|---|---|---|
| 6,832,473 B2 * | 12/2004 | Kupe et al. | 60/286 |
| 7,040,088 B2 * | 5/2006 | Covit | 60/300 |
| 7,165,393 B2 * | 1/2007 | Betta et al. | 60/286 |
| 2004/0187483 A1 | 9/2004 | Dalla Betta et al. | |
| 2005/0000209 A1 * | 1/2005 | Takahashi et al. | 60/286 |
| 2005/0150221 A1 * | 7/2005 | Crawley et al. | 60/295 |

* cited by examiner

EXHAUST SYSTEM FOR AN INTERNAL COMBUSTION ENGINE AND A RESPECTIVE OPERATING METHOD

BACKGROUND

The present invention relates to an exhaust system for an internal combustion engine, in particular in a motor vehicle, and a respective operating method.

Such an exhaust system usually includes an exhaust line in which at least one oxidation catalytic converter is provided for treating the exhaust gases coming from the internal combustion engine.

When an internal combustion engine is turned off for a lengthy period of time, the engine and its components such as the exhaust system assume the ambient temperature. When the internal combustion engine that has cooled to this extent is started up, which is referred to as a cold start, there are increased emissions of pollutants due to the low temperatures prevailing inside the components involved. The oxidation catalyst has a definitely diminished oxidizing effect for unburned or incompletely burned hydrocarbons—or none at all—at temperatures below the operating temperature in particular. To comply with increasingly stringent environmental safety requirements, it is desirable to design the cold start phase of an internal combustion engine to be as short as possible.

The present invention addresses the problem of providing an improved embodiment or at least a different embodiment for an exhaust system and/or a respective operating method that will make it possible to shorten the cold start phase in particular.

SUMMARY

This invention is based on the general idea of oxidizing secondary fuel with the help of a pre-oxidation unit to then supply the partially oxidized intermediate products thereby produced to the oxidation catalyst. Due to the partial oxidation which is accomplished with the help of a suitable oxidizer, preferably oxygen from secondary air, a highly reactive mixture of partially oxidized intermediate products can be produced, which can be reacted, i.e., completely oxidized even at comparatively low temperatures in the oxidation catalyst. For example, the long-chain hydrocarbons of the secondary fuel, i.e., gasoline or diesel, are oxidized to comparatively short-chain hydrocarbons which have a much greater reactivity. At the same time heat is released by partial oxidation, leading to an increase in temperature in the oxidation catalyst. The increased reactivity of the mixture supplied to the oxidation catalyst via the exhaust line results in the mixture being converted in the oxidation catalyst at comparatively low temperatures which are considerably lower than the "normal" operating temperature of the oxidation catalyst, so that additional heat is released, likewise increasing the temperature of the oxidation catalyst. With the help of this invention, the temperature of the oxidation catalyst can thus be raised very rapidly during a cold start, so that it quickly reaches the operating temperature and can manifest the desired cleaning effect for the exhaust gases of the internal combustion engine. Due to the fact that the cold start phase for the oxidation catalyst is shortened, the emissions of the internal combustion engine in a cold start can be decreased.

According to a particularly advantageous embodiment, the pre-oxidation unit is designed so that gaseous hydrogen is formed as a partially oxidized intermediate which is characterized by a particularly high reactivity even at low temperatures.

Other important features and advantages of the present invention are derived from the subclaims, the drawings and the respective description of the figures on the basis of the drawings.

It is self-evident that the features which are mentioned above and those that are yet to be explained below may be used not only in the particular combination given but also in other combinations or even alone without going beyond the scope of the present invention.

BRIEF DESCRIPTION OF THE DRAWINGS

Preferred exemplary embodiments of this invention are depicted in the drawings and explained in greater detail in the following description, where the same reference notation is used to refer to the same or functionally same or similar parts.

The figures show, each schematically.

DETAILED DESCRIPTION OF THE INVENTION

Figure 1:
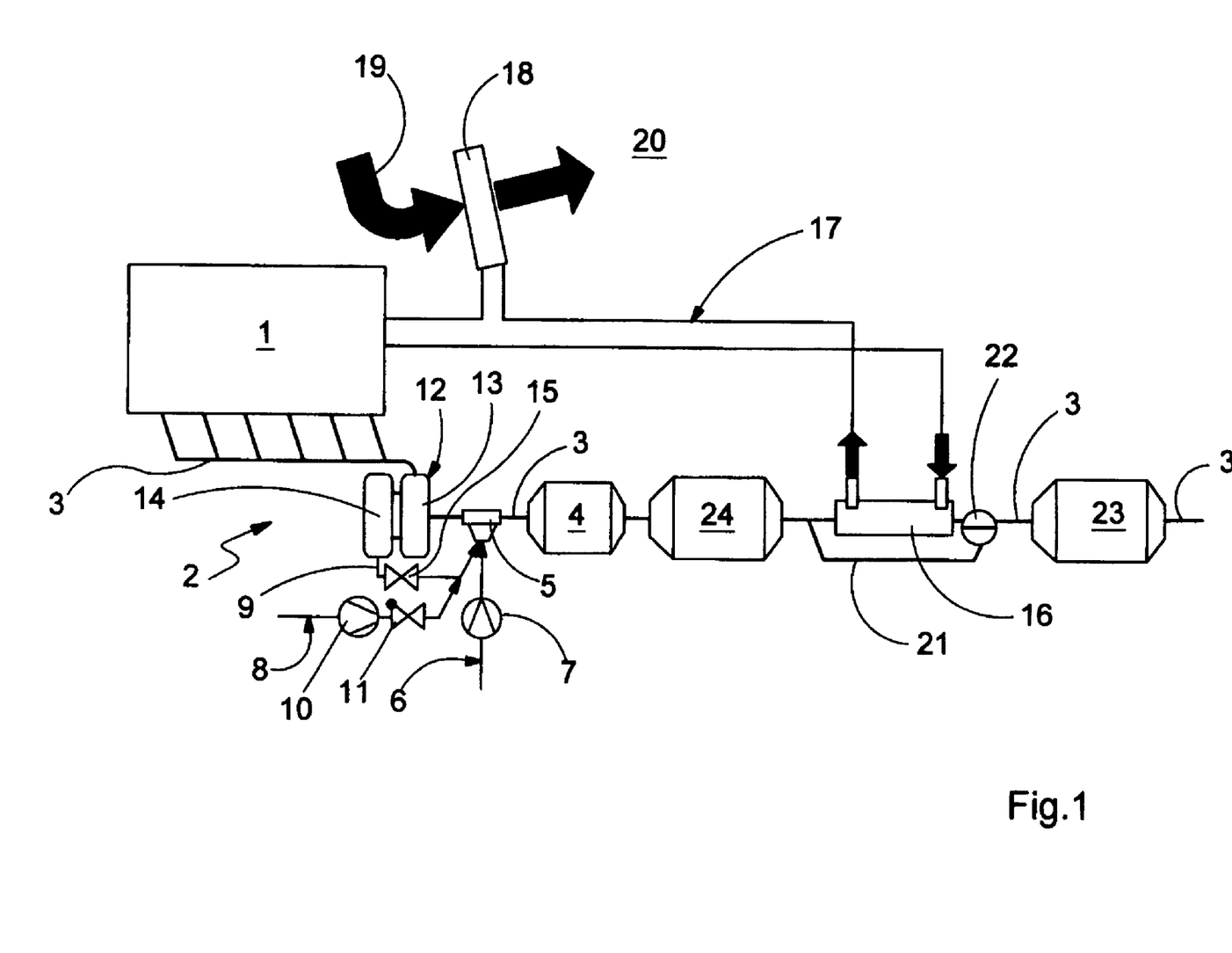
FIG. 1 a basic diagram of an internal combustion engine equipped with an exhaust system according to this invention, FIG. 2 a view like that in FIG. 1 but showing a different embodiment, FIG. 3 a greatly simplified basic diagram of a pre-oxidation unit, FIG. 4 a view like that in FIG. 3 but showing a different embodiment, FIG. 5 a view like that in FIG. 3, but showing a different embodiment.

According to FIG. 1, an internal combustion engine 1, e.g., a gasoline engine, but preferably a diesel engine, is equipped with an exhaust system 2 and may be provided in a motor vehicle in particular. The exhaust system 2 comprises an exhaust line 3 which carries the exhaust gases generated by the internal combustion engine 1 during operation away from the internal combustion engine 1. The exhaust line 3 includes at least one oxidation catalyst 4 which is used to treat the exhaust gases coming from the combustion engine 1 and in particular oxidizes essentially completely the fuel residues which have not been burned completely or at all in the combustion chambers of the internal combustion engine 1 during the combustion process, thereby reducing the emissions of the internal combustion engine 1.

According to this invention, the exhaust system is equipped with a pre-oxidation unit 5 which is situated upstream from the oxidation catalyst 4 in the exhaust line 3. A secondary fuel supply 6 which is connected to the pre-oxidation unit 5 operates independently of a fuel supply (not shown) for the internal combustion engine 1. For autonomous operation of the secondary fuel supply 6 even when the internal combustion engine 1 is turned off, the secondary fuel supply 6 here is equipped with its own fuel pump 7. The secondary fuel supply 6 can supply secondary fuel to the pre-oxidation unit 5; this is expediently the same fuel which is also supplied to the internal combustion engine 1, i.e., preferably gasoline or diesel.

The pre-oxidation unit 5 is also designed so that it can oxidize the secondary fuel supply to it with the help of a suitable oxidizer, thus resulting in partially oxidized intermediate products which are sent by the pre-oxidation unit 5 into the exhaust line 3. These partially oxidized intermediate products can then be completely oxidized in the oxidation catalyst 4.

The preferred oxidizer is oxygen, which is fundamentally capable of removing the lean exhaust gases from the internal combustion engine 1. However, a separate air supply, e.g., in the form of a secondary air supply 8 and/or in the form of a branch line 9 is preferably provided for the pre-oxidation unit 5.

The separate secondary air supply 8 operates independently of the internal combustion engine 1, i.e., even when the internal combustion engine 1 is turned off. Therefore, the secondary air supply 8 has a fan and/or a pump 10 and optionally also a non-return valve 11 which opens toward the pre-oxidation unit 5 and is blocked toward the pump 10.

In contrast with that, the branch line 9 is connected to a compressor side of a turbocharger 12 and can thus supply compressed fresh air as secondary air to the pre-oxidation unit 5. The branch line 9 can be controlled here with a valve 15 for opening and closing. In the exemplary embodiment depicted here, the turbocharger 12 is an exhaust turbocharger with a turbine 13 which is situated in the exhaust line 3 upstream from the pre-oxidation unit 5 and a compressor 14 with the branch line 9 branching off from it. It is clear that the turbocharger 12 may also be some other suitable charging device such as a mechanical charger.

In addition, an exhaust heat exchanger 16 is also provided in the exhaust line 3, namely downstream from the oxidation catalyst 4. The exhaust heat exchanger 16 is tied into an engine cooling system 17 which also serves to cool the internal combustion engine 1. A corresponding cooler for this engine cooling system 17 is not shown here. The engine cooling system 17 here contains a heating heat exchanger 18 with the help of which an air stream 19 can be heated and can be supplied, for example, to a space 20 that is to be heated. This space 20 is expediently the interior of a motor vehicle.

In addition, the engine cooling system 17 may also be used in a cold start of the internal combustion engine 1 for more rapid heating of the internal combustion engine 1 by removing heat from the exhaust via the exhaust heat exchanger 16 and supplying heat to the internal combustion engine 1 via the engine cooling system 17. In addition, for the case when the internal combustion engine 1 does not generate excess heat during normal operation, the air stream 19 can nevertheless be heated via the engine cooling system 17 because the heat required to do so can be withdrawn from the exhaust gas of the internal combustion engine 1 with the help of the exhaust heat exchanger 16. Even when the internal combustion engine 1 is turned off, heating of the air stream 19 is fundamentally possible because hot exhaust gases can be generated with the help of the pre-oxidation unit 5 in particular in combination with the oxidation catalyst 4, and the heat of this hot exhaust can be transferred via the exhaust heat exchanger 16 to the engine cooling system 17 and via the heating heat exchanger 18 to the air stream 19.

If heat transfer to the engine cooling system 17 is not desirable, a bypass line 21 can be activated, bypassing the exhaust heat exchanger 16. The bypass line 21 may be controlled with the help of a valve 22, for example.

The exhaust system 2 may also be equipped with an $NO_x$ storage catalytic converter 23 which is expediently provided downstream from the exhaust heat exchanger 16 in the exhaust line 3. In this area of the exhaust line, the exhaust system 2 may advantageously also have an SCR catalyst with an upstream urea metering system. In addition, the exhaust system 2 may be equipped with a particulate filter 24 which is expediently provided between the oxidation catalyst 4 and the exhaust heat exchanger 16 in the exhaust line 3.

With the help of the exhaust system 2 depicted in FIG. 1, several different functions can be implemented if the exhaust system 2 is operated in a suitable manner. An inventive operating method for the exhaust system 2 is explained below together with several design variants.

In a cold start of the internal combustion engine 1, a catalyst heating operation can be implemented with the exhaust system 2 with the help of which particularly rapid heating of the oxidation catalyst 4 can be achieved. In catalyst heating operation, secondary fuel is partially oxidized in the pre-oxidation unit 5 with an oxidizer, e.g., secondary air from the secondary air supply 8 or secondary air from the branch line 9 or residual oxygen from the exhaust gas of the internal combustion engine 1 in lean operation of the internal combustion engine 1 accordingly. In the case of partial oxidation of the secondary fuel, waste heat is formed, contributing toward heating of the oxidation catalyst 4. In addition, partial oxidation of the secondary fuel results in the formation of highly reactive intermediate products, in particular short-chain hydrocarbons, which can be oxidized essentially completely even at low temperatures in the oxidation catalyst 4. This complete oxidation results in the release of additional heat to the oxidation catalyst 4. Thus, on the whole, the temperature of the oxidation catalyst 4 can be increased rapidly. At the same time, heat can be withdrawn from the comparatively hot exhaust gases via the exhaust heat exchanger 16 and supplied to the internal combustion engine 1 so that accelerated heating of the internal combustion engine 1 can also be achieved. Thus, on the whole, the cold start process can be shortened considerably, which means decreased pollution emissions on the one hand and less wear as well as lowered cold start consumption for the internal combustion engine 1 on the other hand.

Depending on the design of the pre-oxidation unit 5 and/or depending on the temperature of the oxidation catalyst 4, it may be expedient to completely oxidize the secondary fuel in the pre-oxidation unit 5 with the respect oxidizer at the start of the catalyst heating operation; for example, this may be the case if the respective partially oxidized intermediate products cannot be oxidized completely or at all at the respective catalyst temperature in the oxidation catalyst 4. Due to the complete oxidation of the secondary fuel in the pre-oxidation unit 5, the temperature of the oxidation catalyst 4 may be increased rapidly so that the partially oxidized intermediate products can now be completely oxidized in the oxidation catalyst 4 when there is a switch from the pre-oxidation unit 5 to partial oxidation of the secondary fuel.

The pre-oxidation unit 5 can thus be switched between fuel oxidation operation and partial oxidation operation. In addition, it is fundamentally possible to also switch the pre-oxidation unit 5 to evaporation operation if the pre-oxidation unit 5 is designed for evaporation of the secondary fuel supplied to it. Switching between the different operating states of the pre-oxidation unit is expediently accomplished by regulating the quantity of oxidizer supplied. For example, complete oxidation operation of the pre-oxidation unit 5 can be implemented by supplying the oxidizer in a stoichiometric amount or in a greater than stoichiometric amount, i.e., there is an excess of oxidizer in comparison with the quantity of secondary fuel supplied. Partial oxidation operation of the pre-oxidation unit 5 can be established for example by supplying the oxidizer in a less-than-stoichiometric amount, i.e., there is an excess of secondary fuel. Pure evaporation operation can be achieved in the pre-oxidation unit 5 by supplying no oxidizer at all. Accordingly there is no oxidation reaction in the pre-oxidation unit 5.

The supply of oxidizer and/or secondary air to the pre-oxidation unit 5 may be accomplished with the help of the secondary air supply 8 when the internal combustion engine 1 is turned on and also when the internal combustion engine 1 is turned off. In order for a supply of secondary air to the pre-oxidation unit 5 to be made possible even when the internal combustion engine 1 is turned on, the pump 10 must achieve a pressure level which may occur in the exhaust gas upstream from the oxidation catalyst 4 during operation of the internal combustion engine 1. The pump 10 must therefore be designed with a corresponding power level. As an alternative, it is therefore expedient to design the secondary air supply 8 for operation only when the internal combustion engine 1 is turned off, so that the pump 10 can function at a comparatively low pressure level. Then the supply of secondary air when the internal combustion engine 1 is turned on is accomplished via the branched line 9 which can supply compressed fresh air accordingly. Faulty flow of secondary air and/or exhaust gas through the secondary air and/or exhaust gas through the secondary air supply 8 in the opposite direction can be prevented with the help of the non-return valve 11. If the pre-oxidation unit 5 is in operation when the internal combustion engine 1 is started up, the supply of secondary air to the pre-oxidation unit 5 must be switched from the secondary air supply 8 to the branch line 9 because of the increase in pressure in the exhaust line 3. Since this is a discontinuous process which is associated with a sudden increase in pressure in the exhaust line 3, it is expedient here to temporarily interrupt operation of the pre-oxidation unit 5.

In addition, the heating operation can be implemented with the exhaust system 2 such that with the internal combustion engine 1 running, the exhaust temperature can be raised so that secondary fuel is partially oxidized in the pre-oxidation unit 5 and is supplied to the exhaust line 3 and thus to the oxidation catalyst 4. The heat introduced into the exhaust in this way can be at least partially removed from the exhaust gas again with the help of the exhaust heat exchanger 16 and sent to the engine cooling system 17. This heat can then be supplied as needed, e.g., to the internal combustion engine 1 via the engine cooling system 17. Likewise, with the help of the heating heat exchanger 18, this heat can be withdrawn from the engine cooling system 17 again and used to heat the air stream 19. It is possible in this way to heat the interior 20 of the motor vehicle to a sufficient extent even in the event of cold start of the internal combustion engine 1 and even at low load states of the internal combustion engine 1, and this can be implemented with a comparatively low energy consumption and low emissions.

In addition, when the internal combustion engine 1 is turned off, an auxiliary heating operation can be implemented with the help of the exhaust system 2. In this case, the pre-oxidation unit 5 is supplied with secondary air via the autonomously operating secondary air supply 8 or it may be supplied with secondary fuel with the help of the autonomously operating secondary fuel supply 6. In the pre-oxidation unit 5, the secondary fuel is first evaporated, which can be accomplished, for example, by means of an electric heating, as explained in greater detail below. Then a mixture is formed with the secondary air and this mixture is partially oxidized. The oxidation catalyst 4 may then be used for complete oxidation of the partially oxidized intermediates. Here again it is clear that under certain boundary conditions, complete oxidation of the secondary fuel is achievable even in the pre-oxidation unit 5, at least until the oxidation catalyst 4 has reached an adequate operating temperature. In this way, with the internal combustion engine 1 turned off, hot combustion exhaust can be utilized and its heat can be transferred to the engine cooling system 17 with the help of the exhaust heat exchanger 16 and then transferred from the cooling circuit to the heating heat exchanger 18, where the heat that is supplied can be utilized to heat the air stream 19 and thus to heat the space 20.

During the auxiliary heating operation, it is fundamentally possible to regenerate the particulate filter 24. Such an auxiliary regeneration, i.e., regeneration with the internal combustion engine 1 turned off, has several advantages. First, the particulate filter 24 can be regenerated at definite intervals in this way so that the particulate burden, i.e., the soot burden of the particulate filter 24 is regularly dissipated. In this way the pressure drop established in flow through the particulate filter 24 during operation of the internal combustion engine 1 can be decreased significantly. Secondly, a conventional preheating time of approximately five to ten minutes, during which the auxiliary heating operation is performed before starting the internal combustion engine 1, is sufficient to completely regenerate the particulate filter 24. Local accumulations of soot and/or particulate matter which may occur within incomplete regeneration during driving operation can be prevented by such a complete regeneration. In addition, through regular and complete regeneration of the particulate filter 24, high temporal and local temperature peaks within the particulate filter 24 can then be reliably prevented by regular and complete regeneration of the particulate filter 24. For example, there is then less thermal stress on a filter substrate of the particulate filter 24, which can thus achieve a longer lifetime. Further, due to the lower thermal stress, a less expensive filter substrate such as cordierite may be used with sufficient reliability. This permits considerable cost savings.

In addition, the heat of oxidation released by regeneration of the particulate filter 24, i.e., in burnup of the particulate matter, can be withdrawn from the exhaust in the downstream exhaust heat exchanger 16 and fed back into the engine cooling system 17. For example, this makes it possible to increase the heating output achievable in auxiliary heating operation and/or to reduce the demand for secondary fuel in the pre-oxidation unit 5 accordingly. For example, a particulate filter 24 having a filter volume of 3 liters and a carbon black load of 2 grams per liter yields a heat quantity of 198 kJ. Based on a regeneration time of 3 minutes, this corresponds to a heat output of 1.1 kW thus released. This heat output in auxiliary heating operation corresponds approximately to one-third of the output of a conventional auxiliary heating system and would not usually be significant when the internal combustion engine 1 is running.

The heat introduced via the pre-oxidation unit 5 for triggering regeneration of the particulate filter can be utilized essentially completely to preheat the internal combustion engine 1 and/or to heat the interior 20 of the vehicle in auxiliary heating operation with the help of the exhaust heat exchanger 16. In contrast with that, when the internal combustion engine 1 is turned on the regeneration of the particulate filter in a traditional vehicle that does not have an exhaust exchanger 16 in its exhaust line 3 would result in increased consumption of fuel when regeneration is initiated with the help of an additional fuel injection, e.g., by a secondary fuel injection inside the engine.

Regeneration of the particulate filter 24 can also be performed easily during heating operation, in which case the heat generated in burnup of particulate matter could then also be utilized for heating the space 20 via the exhaust heat exchanger 16.

It is especially advantageous that essentially any heating operation and any auxiliary heating operation that lasts at least approximately 5 minutes is sufficient to completely regenerate the particulate filter 24. The regenerated particulate filter 24 has a low flow-through resistance, which reduces the efficiency of the internal combustion engine 1 and ultimately reduces fuel consumption.

For the case when the engine cooling system 17 does not have any need for heat but the particulate filter 24 must nevertheless be regenerated, the excess heat can be sent through the bypass line 21, thereby bypassing the exhaust heat exchanger 16.

As explained above, an important advantage of the inventive exhaust system 2 is the possibility of being able to heat the oxidation catalyst 4 comparatively rapidly to an operating temperature required for the exhaust treatment in a cold start of the internal combustion engine 1. The preheating or rapid heating of the oxidation catalyst 4 takes place here with the help of the pre-oxidation unit 5 and can be achieved in various ways. A distinction is made below between a non-catalytic pre-oxidation unit 5 and a catalytic pre-oxidation unit 5.

In the case of a non-catalytic pre-oxidation unit 5, the secondary fuel is evaporated on an electrically heated evaporator surface, then mixed with the oxidizer, and next the mixture is ignited on an ignition device. A more detailed description of such a non-catalytic pre-oxidation unit 5 is given further below with reference to FIG. 3. In the case of the non-catalytic pre-oxidation unit 5, it may be advisable at the beginning of the cold start phase, i.e., at the beginning of the catalyst heating operation to add the secondary air in a stoichiometric ratio in order to achieve the most complete possible oxidation of secondary fuel already in the pre-oxidation unit 5.

In contrast with that, in the case of the catalytic pre-oxidation unit 5 the mixture of secondary fuel and oxidizer is partially oxidized on a catalytically active surface and/or in a catalytic converter, but here again, the evaporator surface and/or the catalytic converter may be electrically heated. The partially oxidized intermediates can be oxidized more easily, i.e., at lower temperatures, on the oxidation catalyst 4.

An embodiment of the pre-oxidation unit 5 in which partial oxidation of secondary fuel is performed so that hydrogen gas is formed as an intermediate is especially advantageous. Hydrogen can be reacted at room temperature in a conventional oxidation catalyst 4 so that especially efficient heating of the oxidation catalyst 4 can be achieved here.

By heating the oxidation catalyst 4 by local reaction of partially oxidized fuel, in particular hydrogen, on the catalyst material, another advantage is obtained namely that the oxidation catalyst 4 is first heated in the active areas. This is especially important in the case of aged oxidation catalysts 4 because under these conditions the areas of the oxidation catalyst that are still active catalytically are heated first.

The $NO_x$ storage catalytic converter 23 must also be regenerated in cyclic intervals depending on the $NO_x$ content of the exhaust and the storage capacity. To do so, a reduced exhaust gas mixture, e.g., having an oxidizer-fuel ratio lambda of approximately 0.98, is needed. In the case of a diesel engine, there are problems in supplying such a rich mixture to the engine, e.g., increased formation of soot.

With the help of the pre-oxidation unit 5, the regeneration of the $NO_x$ storage catalytic converter 23 can be implemented especially easily. When the internal combustion engine 1 is turned on, regeneration of the $NO_x$ storage catalytic converter 23 can be implemented by operating the pre-oxidation unit 5 in its evaporator operation, e.g., above a predetermined exhaust temperature which may be approximately 250° C., for example. In other words, the secondary fuel is evaporated in the pre-oxidation unit 5 and supplied to the exhaust of the internal combustion engine without the admixture of oxidizer. Metered addition of secondary fuel is selected in a controlled manner so that the desired reduced atmosphere which is necessary for regeneration of the $NO_x$ storage catalytic converter 23 develops in the exhaust gas.

If the exhaust temperature is below the aforementioned predetermined level, then the secondary fuel can be partially oxidized with a suitable amount of oxidizer in the pre-oxidation unit 5. The partially oxidized intermediates can then be added to the exhaust of the internal combustion engine 1 in such a way that the desired reducing atmosphere is created there again. Through the partial oxidation of the secondary fuel, intermediates with an increased reactivity are supplied; these intermediates can achieve the desired regeneration of the $NO_x$ storage catalytic converter 23 even at lower exhaust temperatures. In particular, partial oxidation in the case of the conventional hydrocarbon fuels leads to a reduction in the molecular chain length. It is especially advantageous to generate intermediate products containing gaseous hydrogen and carbon monoxide, both of which are especially suitable for regeneration of the $NO_x$ storage catalytic converter 23. In addition, the exhaust temperature can be brought rapidly to the aforementioned level or even higher by partial oxidation in the pre-oxidation unit 5 and by full oxidation in the oxidation catalyst 4, e.g., to switch to the type of regeneration that is suitable there.

In addition, it is fundamentally also possible to regenerate the $NO_x$ storage catalytic converter 23 when the internal combustion engine 1 is not running because both the secondary air supply 8 and the secondary fuel supply 6 function autonomously. Accordingly, even when the internal combustion engine 1 is not running, a reactive mixture of partially oxidized intermediates can be generated, forming an atmosphere suitable for regeneration of the $NO_x$ storage catalytic converter 23.

When the internal combustion engine 1 is running, it is necessary when the reducing atmosphere is produced in the exhaust gas to take into account the residual oxygen content in the exhaust of the internal combustion engine 1 upstream from the pre-oxidation unit 5. If necessary, a fresh air supply to the internal combustion engine 1 may have to be throttled for regeneration of the $NO_x$ storage catalytic converter 23.

The arrangement of the $NO_x$ storage catalytic converter 23 proposed here downstream from the particulate filter 24 offers advantages with regard to the regeneration of the particulate filter 24 because nitrogen oxides, for example, which may occur may occur in regeneration of the particulate filter 24 can be collected in the $NO_x$ storage catalytic converter 23. However, the fact that oxides of carbon which are also formed in regeneration of the particulate filter 24 manifests a reducing effect or atmosphere in the exhaust that is suitable for regeneration of the $NO_x$ storage catalytic converter even at much lower temperatures than hydrocarbons, for example, is much more important. Accordingly, regeneration of the particulate filter 24 may be associated with at least partial regeneration of the $NO_x$ storage catalytic converter 23.

Nevertheless, this advantageous arrangement is usually avoided in conventional exhaust systems because relatively high temperature peaks can occur in a traditional regeneration of a particulate filter and can cause thermal damage to the sensitive $NO_x$ storage catalytic converter downstream.

With the present inventive exhaust system 2, the exhaust heat exchanger 16 is located between the particulate filter 24 and the $NO_x$ storage catalytic converter 23, so hot exhaust gases leaving the particulate filter 24 due to regeneration of the latter can be cooled in the exhaust heat exchanger 16 to such an extent that the downstream $NO_x$ storage catalytic converter 23 is reliably protected from excess temperatures. In addition, the comparatively frequent regeneration of the particulate filter 24 during auxiliary heating operation or during additional heating operation as proposed here ensures that only relatively small quantities of soot will collect in the particulate filter 24 and will not result in any extremely high temperatures when they burn up.

For example, to protect the $NO_x$ storage catalytic converter 23 from excess temperatures, the exhaust temperature is monitored and the exhaust heat exchanger 16 is activated by blocking the bypass line 21 when the exhaust temperature exceeds a predetermined allowed maximum temperature for the $NO_x$ storage catalytic converter 23.

Today's fuels, in particular diesel fuel, may contain sulfur, so this results in progressive sulfur poisoning of the $NO_x$ storage catalytic converter 23 during operation of the internal combustion engine 1, i.e., the storage capacity of the $NO_x$ storage catalytic converter 23 for $NO_x$ is reduced progressively due to the formation of sulfate. Accordingly, desulfation must also be performed here regularly. To do so, a reducing atmosphere must be created in the exhaust at high temperatures, e.g., 700° C. In the case of a traditional exhaust system, such desulfation is associated with a comparatively high energy consumption because the internal combustion engine must be operated with a rich mixture for a comparatively long period of time of 10 minutes, for example.

Here again the inventive exhaust system 2 can create a remedy because with the help of pre-oxidation unit 5 in combination with the downstream oxidation catalyst 4, a reducing mixture with the required high temperature can be created especially easily by oxidation of the secondary fuel. The temperature and lambda value can be regulated relative easily through a suitable combination of the quantity of fuel and the quantity of air in the pre-oxidation unit 5. In addition, the residual oxygen content of the exhaust is to be taken into account upstream from the pre-oxidation unit 5 when the internal combustion engine 1 is running.

With the help of the pre-oxidation unit 5, desulfation of the $NO_x$ storage catalytic converter 23 can be achieved either with the internal combustion engine 1 turned on, if it is operated at a low load, or with the internal combustion engine 1 turned off. If desulfation is to be performed with the internal combustion engine 1 operating at a higher load level, then throttling of the fresh air supplied to the internal combustion engine 1 may also be necessary. The bypass line 21 is expediently activated during heating of the $NO_x$ storage catalytic converter 23 so that the hot reducing exhaust gas mixture can be sent directly to the $NO_x$ storage catalytic converter 23.

Another advantage of the inventive exhaust system 2 is that the function of an auxiliary heating system can be implemented in this way with a comparatively minor design complexity. In addition, the exhaust treatment system of the internal combustion engine 1 is fully available for cleaning the exhaust gases of this "auxiliary heating" at the same time. The auxiliary heating function implemented with the pre-oxidation unit 5 in the exhaust system 2 thus operates with extremely low pollution emission levels. In addition, the cleaning agents made available such as particulate filter 24 and $NO_x$ storage catalytic converter 23 can be regenerated autonomously.

Figure 2:
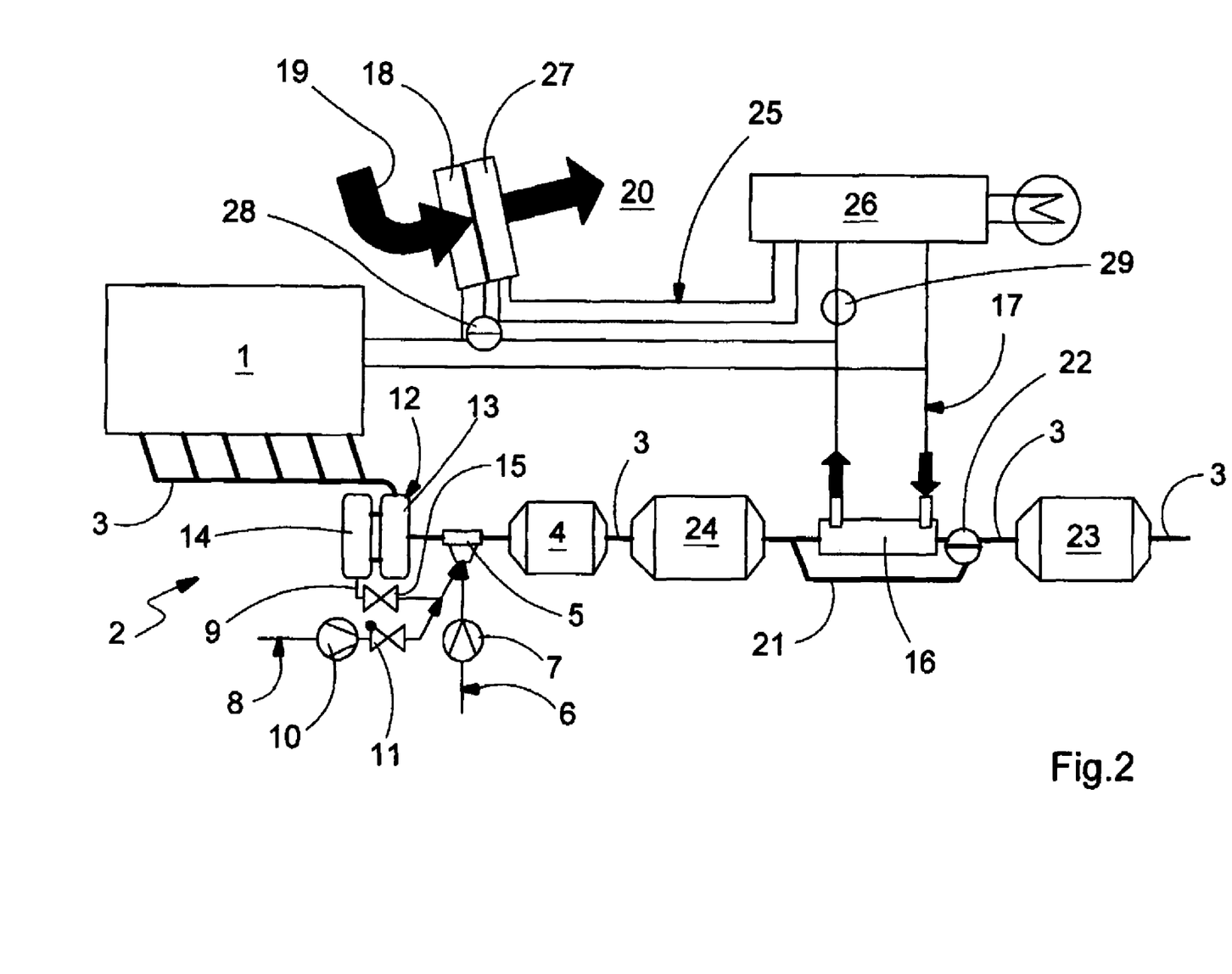

According to FIG. 2, an air-conditioning refrigeration circuit 25 may also be connected to the engine cooling system 17. The air conditioning refrigerant circuit 25 contains an adsorption refrigerating machine 26 or alternatively an absorption refrigerating machine 26. The air-conditioning refrigeration circuit 25 also includes an air-conditioning heat exchanger 27 with the help of which the air stream 19 can be cooled. In this way, heat can be withdrawn from the exhaust via the exhaust exchanger 16 and supplied to the adsorption or absorption refrigerating machine 26 via the engine cooling system 17. The refrigeration system can cool the refrigerant circulating in the air-conditioning refrigeration circuit 25 with the help of the heat, thus making it possible to withdraw heat from the air flow 19 and thereby cool it. Ultimately in this way this space 20, preferably the vehicle interior 20 can be cooled.

Essentially it has long been known that cold can be generated by using heat with the help of an absorption or adsorption refrigeration process. This is an especially desirable method of producing refrigeration from the standpoint of fuel consumption and $CO_2$ balance. Use in motor vehicles usually fails due to the fact that an absorption or adsorption refrigerating machine 26 has a much larger volume than conventional compressor refrigeration technology. However, the deciding factor is that zeolitic adsorbents which are used in traditional adsorption refrigeration systems have desorption temperatures of at least 150° C., which cannot usually be supplied by the coolant circulating in a traditional engine cooling system.

Here again, the inventive exhaust system 2 provides an expedient because by using the heat contained in the exhaust gases, the engine cooling system 17 is able to supply the required high temperatures at least as far as the adsorption or absorption refrigeration system 26. In this way it is possible to operate such an adsorption or absorption refrigeration process economically. To be able to implement the higher temperatures in the engine cooling system 17, it may be expedient to use instead of a traditional coolant a different type of coolant which is more suitable for the elevated temperatures. As an alternative, it is likewise possible not to tie the exhaust heat exchanger 16 directly into the engine cooling system 17 but instead to tie it in indirectly via an additional fluid circuit which tolerates higher temperatures in the fluid. The connection to the engine cooling system 17 is then accomplished via a corresponding heat exchanger, which is tied into the engine cooling system 17 as well as into the aforementioned additional fluid circuit.

In the present case, overheating of the internal combustion engine 1 is prevented by the fact that two actuating elements 28 and 29 are provided with which the engine cooling system 17 is passed through the internal combustion engine 1 and the heat exchanger 18 on the one hand or alternatively through the adsorption or absorption refrigeration system 26 on the other hand.

For the case when the exhaust gas from the internal combustion engine 1 does not contain enough heat in cooling operation, secondary fuel can be partially oxidized with the help of the pre-oxidation unit 5 and sent to the oxidation catalyst 4 for complete oxidation. In addition, an auxiliary cooling operation can be implemented because the pre-oxidation unit 5 can be operated independently of the internal combustion engine 1. The function here is similar to that in auxiliary heating operation except that the heat withdrawn from the exhaust gas cannot be used to heat the air stream but instead is used to cool the air stream 19.

At the same time, in cooling operation and/or in auxiliary cooling operation, regeneration of the particulate filter 24 and/or regeneration of the $NO_x$ storage catalytic converter 23 and/or heating of the oxidation catalyst 4 can be implemented.

Cooling of the exhaust with the help of the exhaust heating exchanger 16, in particular in combination with the absorption or adsorption refrigeration system 26 results in the volume flow of the exhaust being reduced downstream from the exhaust heat exchanger 16, which is in turn associated with a smaller pressure drop.

In addition, with the exhaust system 2 according to this invention, it is especially advantageous that the various extra functions can usually be implemented without any great additional need for space. In particular, the pre-oxidation unit 5 requires only a comparatively small amount of space. According to FIG. 3, the pre-oxidation unit 5 may be equipped with an ignition device 30, e.g., in the form of a spark plug. In this way, the respective oxidation reaction can be initiated and maintained. The pre-oxidation unit 5 is also equipped with an evaporator device 31, which may be formed, for example, by a porous evaporation body 32 such as a nonwoven body. The evaporation body 32 presents an extremely large evaporator surface to the liquid fuel injected or sprayed into it so that the liquid fuel can be distributed on this evaporator surface, which supports the evaporation of the fuel. In addition, the evaporation body 32 may also be electrically heated. Electric heating is labeled as 33 in FIG. 3 and may consist of a heating coil integrated into the evaporation body 32, for example. The heating of the evaporation body 32 and thus the evaporation surface additionally increases the evaporation effect.

Figure 3:
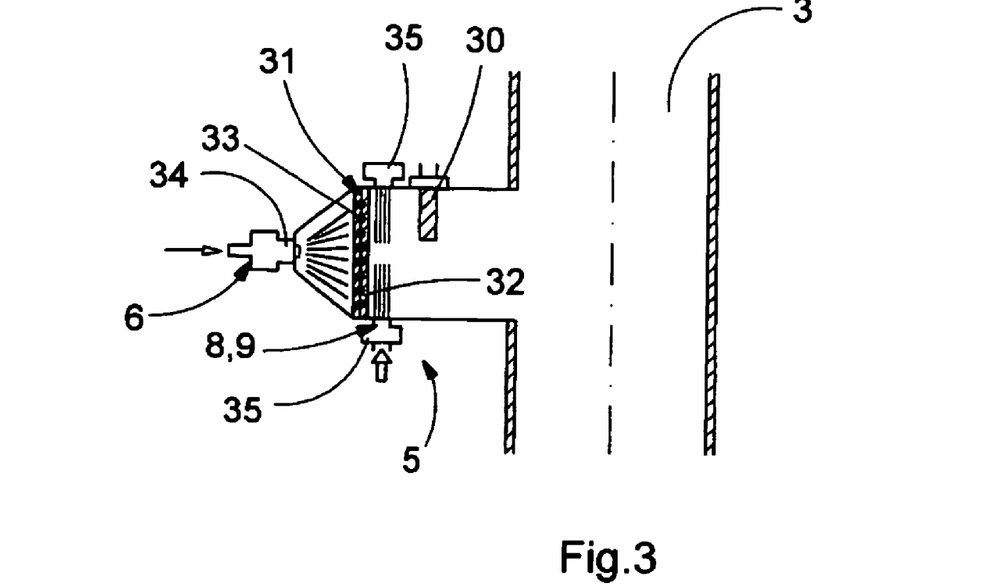

The secondary fuel supply 6 includes, for example, a fuel injector 34 which introduces the fuel in the direction of the evaporation body 32. The secondary air supply 8 and/or the branch line 9 introduced the secondary air into the pre-oxidation unit 5, e.g., through inlet nozzles 35 arranged in a ring pattern downstream from the evaporation body 32. This makes it possible to achieve an intense mixing effect. The mixture of air and evaporated fuel then goes to the ignition device 30 where the mixture is ignited so that the desired oxidation reaction can take place. The pre-oxidation unit 5 then opens into the exhaust line 3.

FIG. 3 thus shows a non-catalytic pre-oxidation unit 5. The selected evaporator body 32 has a heatable evaporation surface and is also designed so that droplet break-through can be prevented in fuel injection. The fuel droplets generated by the injection process are deposited on the porous evaporation body 32, which is made of a nonwoven material, for example, and remain there until they evaporate completely. The fuel vapor then emerges from the evaporation body 32 on the downstream side thereof. The secondary air is introduced here into the pre-oxidation unit 5 on the downstream side of the evaporation body 32, which results in an intense mixing and turbulence effect. As an alternative, the secondary air may also be added upstream from the evaporation body 32, which support the evaporation.

If the secondary air is supplied in a greater-than-stoichiometric amount through the inlet nozzles 5, a flame may develop on or downstream from the ignition device 30, which results in essentially complete oxidation. If the secondary air is added in less than a stoichiometric amount, this results only in the desired partial oxidation which need not lead to a visible flame. These partial oxidation reactions may take place in a temperature range in which no flame can be observed.

Figure 4:
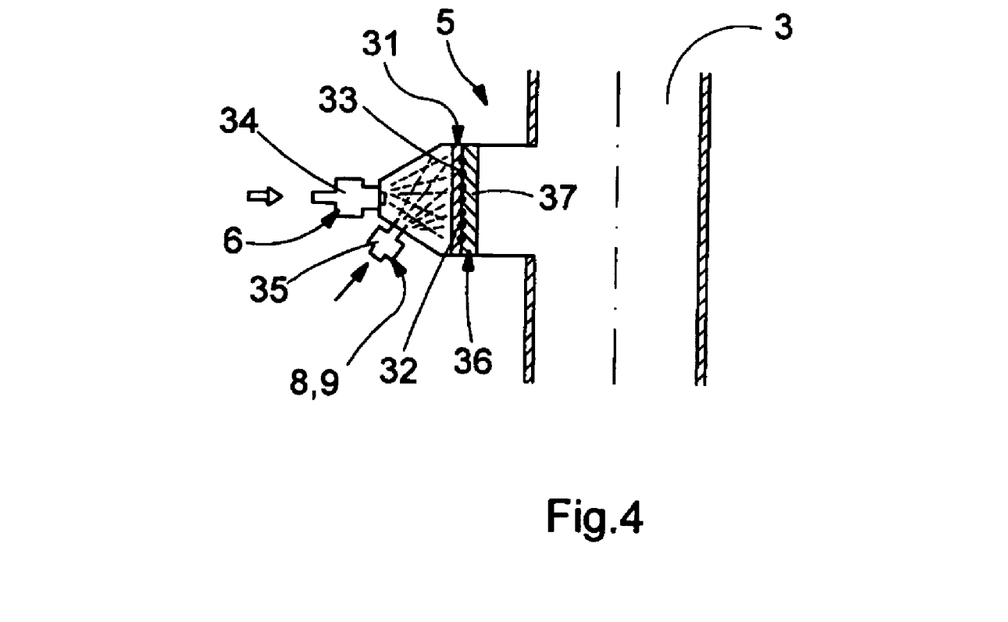

In the embodiment according to FIG. 4, the pre-oxidation unit 5 is equipped with a catalyst 36 which may be formed here as an example by a catalytically coated porous catalytic converter body 37. In the present case, the evaporation body 32 and the catalytic converter body 37 are arranged in direct contact one after the other in the direction of flow with the heating unit 33 being arranged between the two bodies 32 and 37 and thus also heating the catalytic converter body 37 in addition to the evaporation body 32 at the same time. In this embodiment, the air is injected upstream from the evaporation body 32, so that the mixture is formed simultaneously with the evaporation of the fuel. The fuel vapor-air mixture reaches the catalytic converter body 37 in this way. The catalytic converter body 37 here is designed so that it permits the desired oxidation of the fuel in combination with the oxidizer.

FIG. 4 thus shows a catalytic pre-oxidation unit 5 with which the fuel is also evaporated on a heated evaporator surface. The partial oxidation can be implemented in a suitably designed catalyst 36 at temperatures which are much lower than the temperatures in the area of the ignition device 30 in the non-catalytic embodiment of the pre-oxidation unit 5 according to FIG. 3. Through a suitable choice of the respective catalyst material, a selectivity for certain partially oxidized intermediates, e.g., hydrogen, can also be achieved.

The catalytic converter body 37 may essentially consist of a nonwoven body, the material of which is coated with a catalyst. Due to the electric heatability of the catalyst 36, the partial oxidation may take place on the catalyst 36 immediately at the beginning of a cold start.

Figure 5:
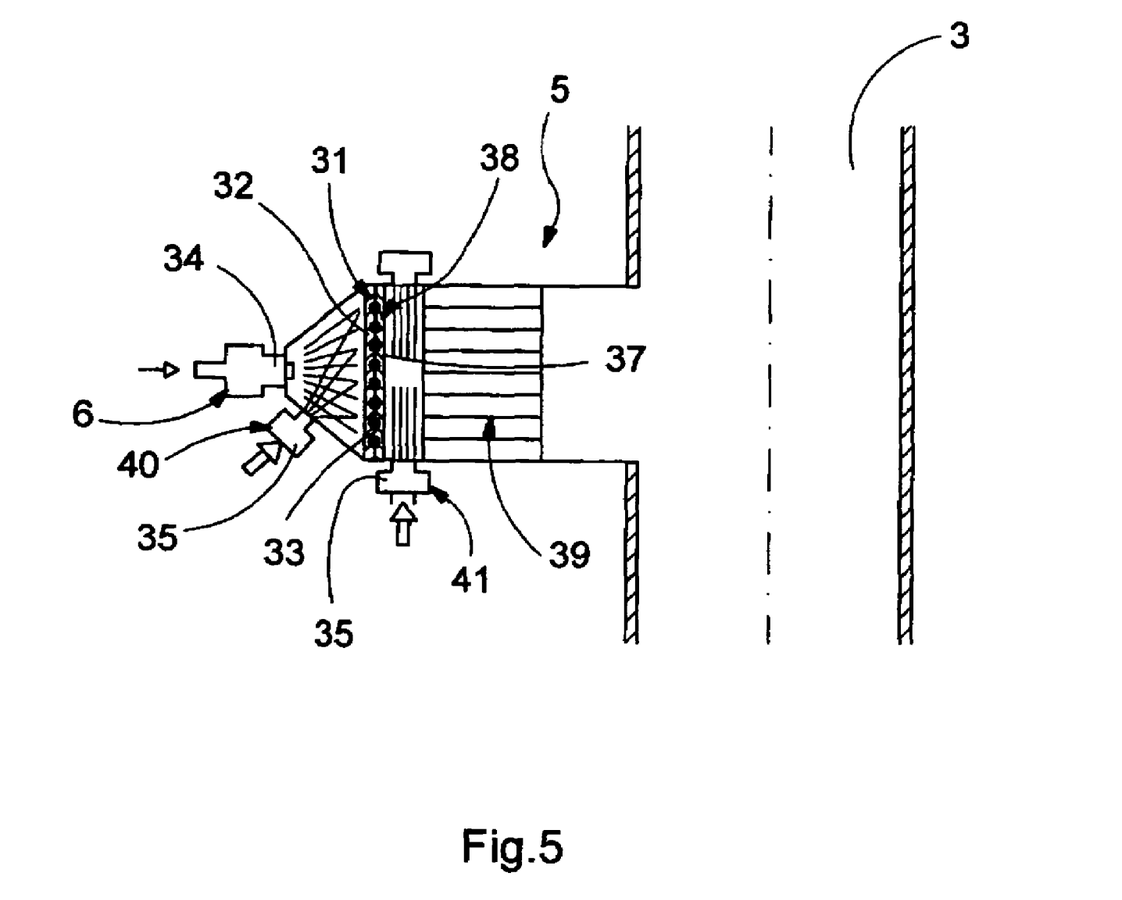

According to FIG. 5, the pre-oxidation unit 5 may also have two catalysts in another embodiment, namely a first catalytic converter 38 and a second catalytic converter 39. In addition, two oxidizer feeds, namely a first oxidizer feed 40 and a second oxidizer feed 41 are also provided. The two oxidizer fees 40, 41 are implemented with the help of inlet nozzles 35 and are connected to the secondary air supply 8 and/or to the branch line 9.

The first catalytic converter 38 again includes, for example, a porous catalytic converter body 37, which may have a catalytically active coating. In the present case, this catalytic converter body 37 is arranged directly adjacent to the evaporation body 32, as in the embodiment according to FIG. 4. The heating unit 33 is again situated between the evaporation body 32 and the catalytic converter body 37. The second catalytic converter 39 has a monolithic structure, for example, and has multiple parallel channels which have an active catalytic coating. The second catalytic converter 39 is situated downstream from the first catalytic converter 38.

The first oxidizer feed 40 is located upstream from the first catalytic converter 38 and also upstream from the evaporator device 31. In this way, the fuel vapor-air mixture goes to the first catalytic converter 38 immediately after the mixture is formed, so that the desired partial oxidation can take place in a first part. The second oxidizer feed 41 is positioned between the two catalysts 38 and 39 so that another ignitable mixture is formed upstream from the second catalytic converter 39 and can then enter the second catalytic converter 39, so that a second part of the desired partial oxidation can take place there.

The embodiment illustrated in FIG. 5 has the advantage that in a cold start the first catalytic converter 38 can be heated electrically first so that at least a portion of the secondary fuel can be oxidized partially as it flows through the first catalytic converter 38. In doing do, a relatively small portion of the total amount of oxidizer supplied, i.e., the secondary air that is supplied is usually introduced upstream from the first catalytic converter 38 through the first oxidizer feed 40. This avoids drastic cooling of the first catalytic converter 38 and/or the oxidizer-fuel mixture by the relative cold secondary air, which permits reliable functioning and faster heating of the first catalytic converter 38. Since the partial oxidation process releases heat, this results in additional heating of the first catalytic converter 38. At the same time, the resulting partially oxidized intermediates, i.e., the exhaust of the first catalytic converter 38 can be heat, which also results in heating of the second catalytic converter 39 which is usually larger and more efficient than the first catalytic converter 38. A larger amount of oxidizer and/or air is introduced through the second oxidizer feed 41 downstream from the first catalytic converter 38 and upstream from the second catalytic converter 39. Due to the selected arrangement, the electric heating output for initiating the partial oxidation in the pre-oxidation unit 5 can be reduced on the whole.

What is claimed is:

1. An exhaust system for an internal combustion engine, comprising:
   an exhaust line in which an oxidation catalyst is arranged for treating the exhaust gases coming from the internal combustion engine,
   a pre-oxidation unit arranged in the exhaust line primary flow path of the exhaust gases and upstream from the oxidation catalyst and connected to a secondary fuel supply, distinct from the internal combustion engine, and adapted so that it partially oxidizes the secondary fuel supplied in combination with an oxidizer in a catalyst heating operation and the partially oxidized intermediates are supplied to the oxidation catalyst for complete oxidation,
   wherein the pre-oxidation unit includes a first catalytic converter to initiate and maintain the partial oxidation, and a second catalytic converter downstream from the first catalytic converter, and
   wherein the pre-oxidation unit has a first oxidizer feed which introduces the oxidizer into the pre-oxidation unit upstream from the first catalytic converter and has a second oxidizer feed which introduces the oxidizer into the pre-oxidation unit between the first catalytic converter and the second catalytic converter.

2. The exhaust system according to claim 1, further comprising at least one of:
   a secondary air supply for supplying oxidizer to the pre-oxidation unit and
   a branch line branching off from a turbocharger on the compressor end and leading to the pre-oxidation unit to supply oxidizer to the pre-oxidation unit.

3. The exhaust system according to claim 1, wherein the first catalytic converter has a porous catalytic converter body with a catalytic coating.

4. The exhaust system according to claim 1, wherein said oxidation catalyst operates at a given operating temperature so as to oxidize exhaust gases from the internal combustion engine during normal operation of the internal combustion engine, said given operating temperature being substantially higher than the temperature of said oxidation catalyst at a cold start phase,
   wherein said pre-oxidation unit, during the cold start phase, supplies said partially oxidized intermediates to said oxidation catalyst at a temperature substantially lower than said given operating temperature, and
   wherein said oxidation catalyst further oxidizes said partially oxidized intermediates thereby heating up said oxidation catalyst to said given operating temperature for oxidizing the exhaust gases received from the internal combustion engine.

5. The exhaust system according to claim 1, wherein said partially oxidized intermediates pass directly from said pre-oxidation unit to said oxidation catalyst.

6. The exhaust system according to claim 1, wherein the pre-oxidation unit includes an evaporator unit which evaporates the secondary fuel feed.

7. The exhaust system according to claim 6, wherein the evaporator unit has an electrically heated porous evaporation body.

8. The exhaust system according to claim 1, wherein an exhaust heat exchanger in the exhaust line downstream from the oxidation catalyst is tied into an engine cooling system of the internal combustion engine.

9. The exhaust system according to claim 8, wherein a controllable bypass line is provided, bypassing the exhaust heat exchanger.

10. The exhaust system according to claim 8, wherein an air-conditioning refrigeration system is connected to the engine cooling system and contains and adsorption or absorption refrigerating machine and the air-conditioning heat exchanger which serves to cool an air stream supplied to a space that is to be cooled.

11. The exhaust system according to claim 8, wherein the engine cooling system includes a heating heat exchanger which serves to heat an air stream which is supplied to a space that is to be heated.

12. The exhaust system according to claim 8, wherein an $NO_x$ storage catalytic converter is provided in the exhaust line downstream from the exhaust heat exchanger.

13. The exhaust system according to claim 8, wherein a particulate filter is provided in the exhaust line between the oxidation catalyst and the exhaust heat exchanger.

* * * * *